A. E. DOBBS, W. EAST & J. S. HOWKINS.
STEAM GENERATING PLANT.
APPLICATION FILED AUG. 28, 1909.

992,644.

Patented May 16, 1911.

WITNESSES
J. P. Davis
A. E. Davis

INVENTORS
Walter East
Archibald Edward Dobbs
John Shirley Howkins
BY
Munn & Co
ATTORNEYS

A. E. DOBBS, W. EAST & J. S. HOWKINS.
STEAM GENERATING PLANT.
APPLICATION FILED AUG. 28, 1909.

992,644.

Patented May 16, 1911.

UNITED STATES PATENT OFFICE.

ARCHIBALD EDWARD DOBBS, OF CASTLE DOBBS, NEAR CARRICKFERGUS, IRELAND, WALTER EAST, OF BOURNEMOUTH, AND JOHN SHIRLEY HOWKINS, OF FULHAM, LONDON, ENGLAND.

STEAM-GENERATING PLANT.

992,644. Specification of Letters Patent. Patented May 16, 1911.

Application filed August 28, 1909. Serial No. 515,105.

*To all whom it may concern:*

Be it known that we, ARCHIBALD EDWARD DOBBS, residing at Castle Dobbs, near Carrickfergus, county Antrim, Ireland, WALTER EAST, residing at Dol Peris, Surrey Road, Bournemouth, J. P., and JOHN SHIRLEY HOWKINS, residing at 40 Waldemar Mansions, Waldemar avenue, Fulham, London, S. W., England, subjects of the King of Great Britain and Ireland, have invented certain new and useful Improvements in and Relating to Steam-Generating Plants, of which the following is a specification.

This invention relates to boilers of the type commonly known as "flash" boilers in which the feed water with or without a preliminary heating is passed into tubular elements wherein it is converted into steam and more or less superheated.

In boilers of the above type as heretofore constructed difficulties have arisen in working from the following causes:—Firstly, the absence of an adequate reserve of hot feed water to meet sudden overload demands or temporary pump stoppages. Secondly, the unequal distribution of the feed water to the tubular elements. Thirdly, the fluctuations in the amount of pressure and superheat imparted to the steam. Fourthly, the inability to control the output of the boiler with regularity.

The object of this invention is to provide a boiler in which the above difficulties are overcome in a simple and efficient manner.

The invention consists in a steam generator comprising a flash element combined with a thermal storage element so that the contents of the thermal storage element may be delivered to the flash element for meeting overloads.

The expression "thermal storage" must be understood to imply a large available reserve of water at the temperature corresponding to the pressure of the steam delivered by the generator as in the well known Halpin thermal storage system U. S. Patent 513,922 whereby loads, greatly in excess of the normal capacity of a boiler, can be easily met by closing the feed supply to the thermal storage element and utilizing in the boiler the reserve of hot water which forms the thermal store.

The invention further consists in devices for use in a boiler of the type indicated for insuring the uniform distribution of feed water to each of the inner elements and in certain devices and arrangements of parts hereinafter indicated for insuring an equilibrium of pressures throughout the parts of the boiler.

Referring now to the accompanying drawings which form part of the specification.

In carrying this invention into effect according to one modification, we provide a vessel $a$ preferably cylindrical and constructed of steel. This drum $a$ is designed to withstand high pressures and to this end is preferably provided with a strong stay $b$ although in some cases this stay may be omitted. Leading from the bottom of the drum $a$ is a downcast header $c$ an upcast header $d$ being provided adjacent to $c$, but passing up into the interior of the drum, say nearly as far as the stay $b$. Tubes $e$ lead from the header $c$ to the header $d$ and in their course from $c$ to $d$ pass around the inside of the furnace walls forming a water wall lining to the latter. The tubes $e$ are set with a progressive inclination from *c* to *d* to assist the circulation of water and the disengagement of any vapor or air liberated within these tubes. It is to be understood that these tubes *e*, are not steam generating tubes, but merely circulating feed heating elements working in parallel with one another and working as a whole in series with the feed storage drum *a* their functions being to keep the stored feed water in the drum *a* in active circulation. In view of the fact that the chief function of the tubes *e* is to promote circulation of the water in *a* it will be seen that any suitable form of circulating means may be employed such for example as "Field" tubes, U tubes or the like.

In some cases we may employ a multiple grouping of circulating tubes or circulating means, and again we may provide means whereby portions of the furnace may be controlled separately so that the amount of circulating means heated and consequently the intensity of circulating may be controlled. The furnace controlling means may either have an arrangement of deflectors or direct control of the furnace.

The drum *a* is provided with steam and water gages safety valve and the usual try and scum cocks. Surrounding the water wall of the tubes *e* is a wall of fire-resisting and non-conducting material which may be supported and strengthened by any suitable means such as the framing *g*.

Near the lower part of the furnace wall *f* is a steam collector *h* from which the steam is delivered to the engine by means of a pipe 7, this collector may be of round, D, or any other suitable section and provided with a detachable cover, plug holes or the like. In the drawings this collector is shown of round section. This collector *h* is preferably placed in such a position as to be heated by the furnace. Leading into *h* are a number of tubes *j* which may be bent into any convenient form such as serpentine, spiral or the like but preferably in serpentine form as shown in the drawings. The serpentine grids *j*, are arranged to offer the greatest possible heating surface in a minimum of space. Passing up from the upper part of the furnace walls *f* the tubes *j* are collected into groups the number of groups and the number of tubes in each group being suited to the requirements of the boiler. In the drawings four groups of four tubes each are shown, the tubes in each group and the groups themselves being arranged in parallel. The tubes in each group may be arranged in series while the groups are in parallel or the tubes in each group may be in parallel and the groups in series.

Figure 1:
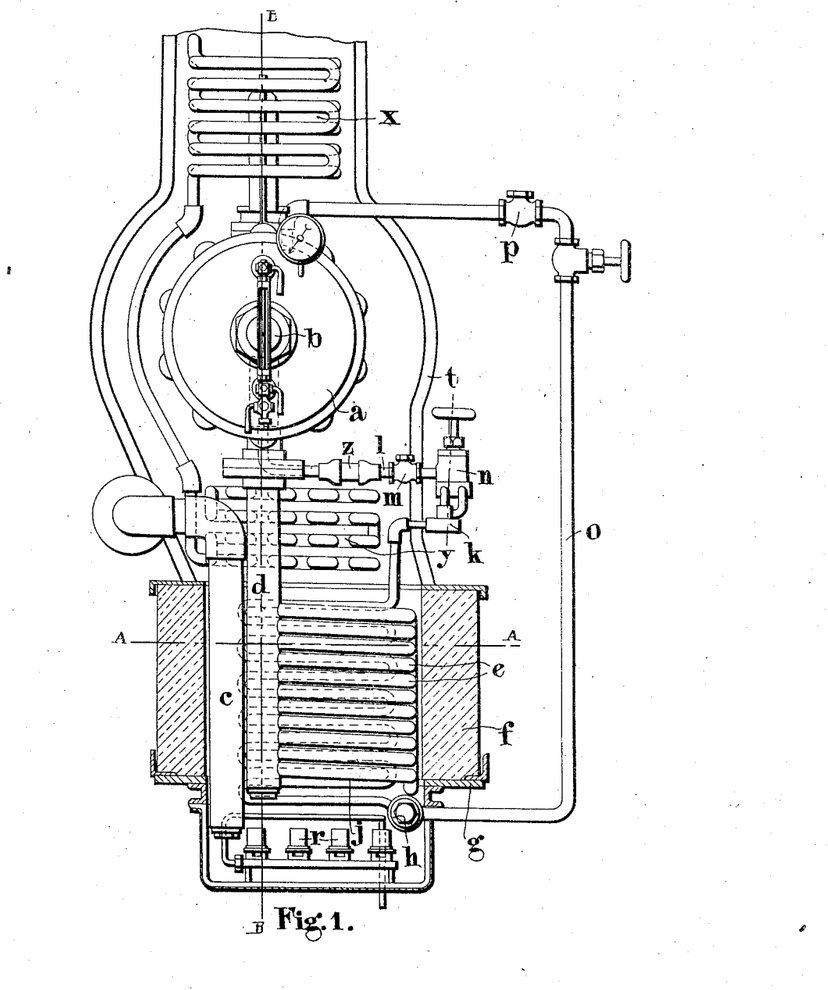
Figure 1 is a part sectional elevation of a steam generator constructed according to the present invention.
Figure 2:
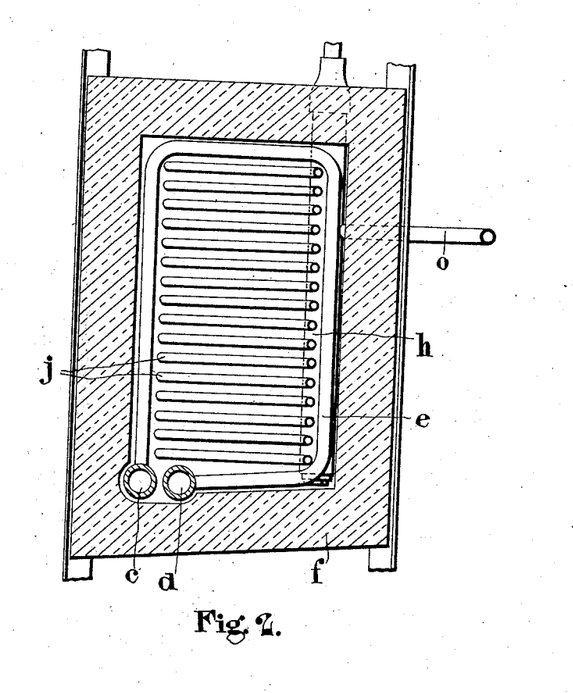
Fig. 2 is a sectional plan of the generator on the line A—A of Fig. 1.
Figure 3:
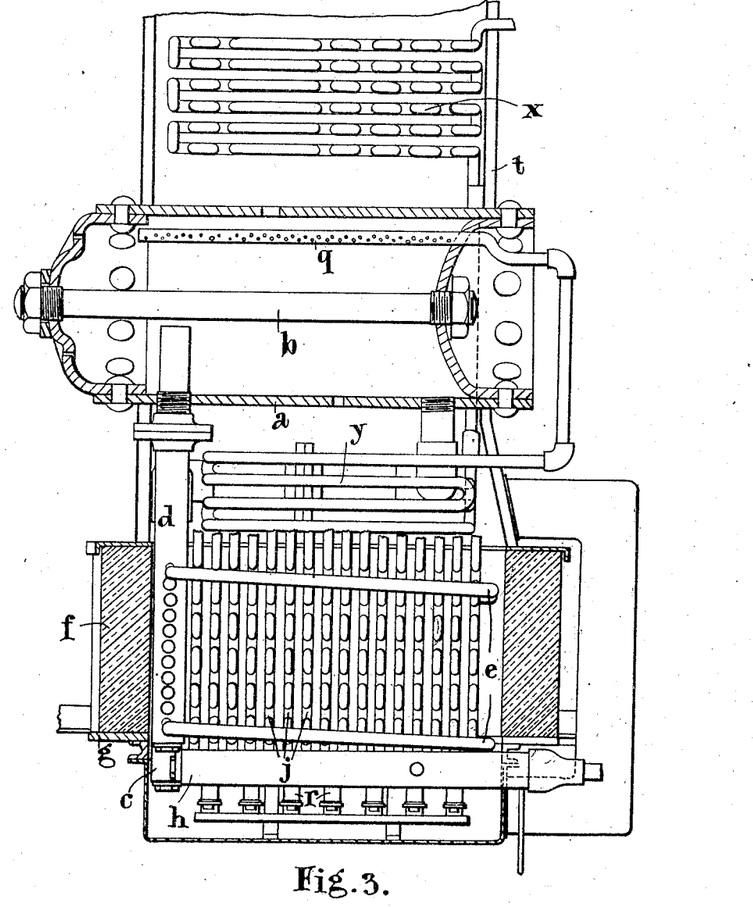
Fig. 3 is a part sectional elevation on the line B—B of Fig. 1.
Figure 4:
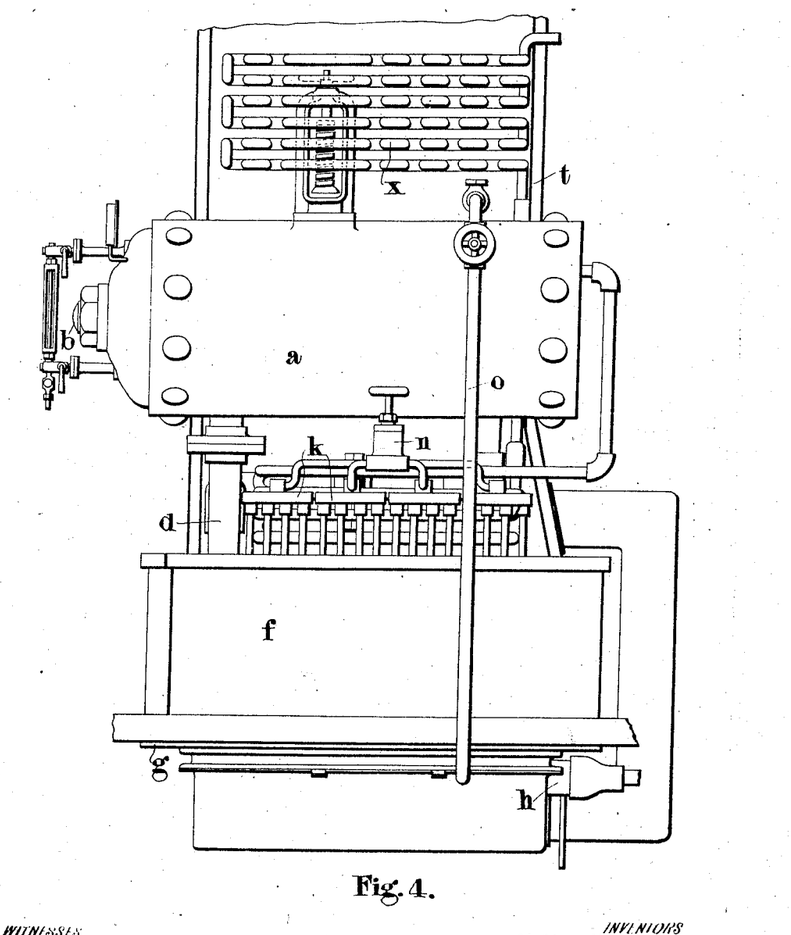
Fig. 4 is a complete side elevation of the generator.
Figure 5:
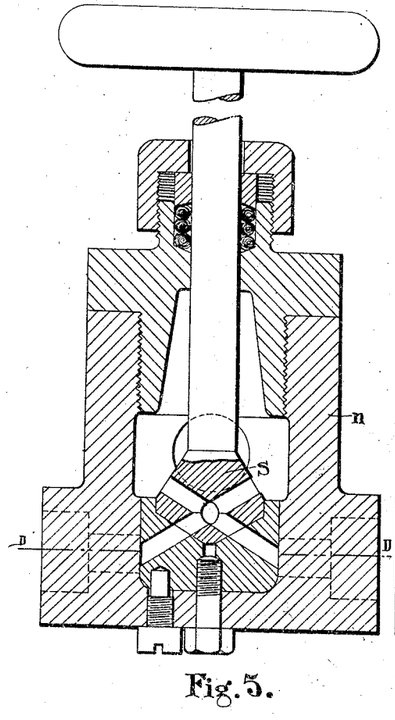
Fig. 5 is a sectional elevation of the distributer, $n$, on the line C—C on Fig. 1.
Figure 6:
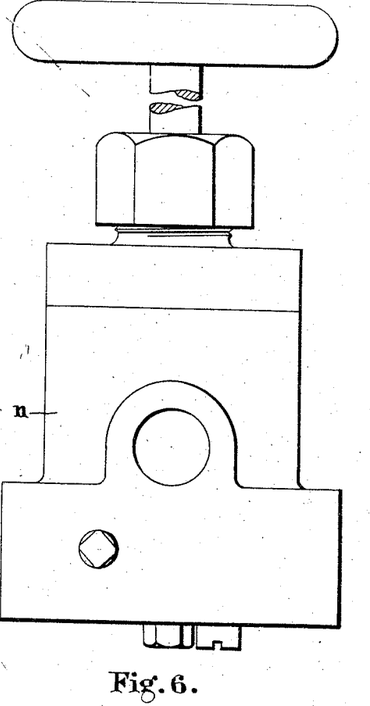
Fig. 6 is an outside elevation of the distributer, $n$.
Figure 7:
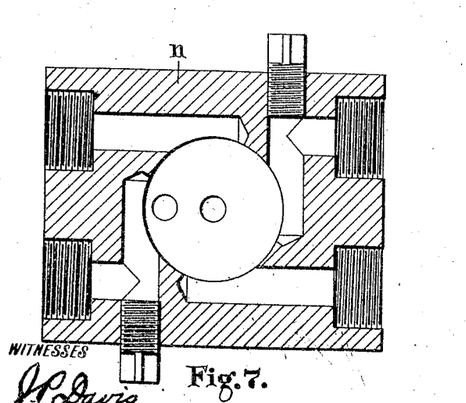
Fig. 7 is a sectional plan on the line D—D of Fig. 5.
Figure 8:
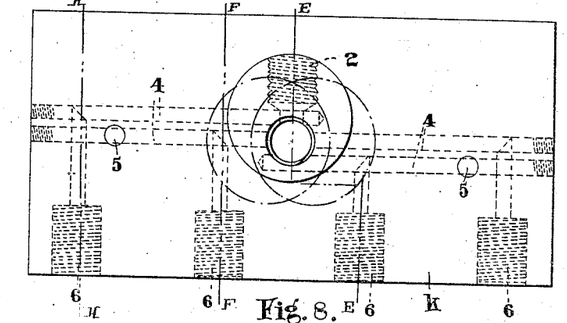
Figs. 8 and 9 are plan and part sectional elevation respectively of one of the sub-distributers shown at $k$, in Figs. 1 and 4.
Figure 9:
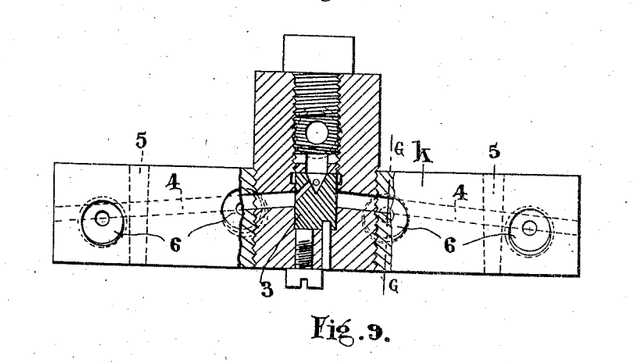
Figure 10:
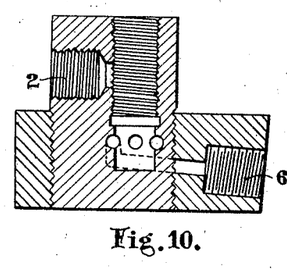
Figs. 10, 11, 12 and 13, are sectional elevations of the sub-distributer on the lines E—E, F—F, G—G and H—H of Figs. 8 and 9.
Figure 11:
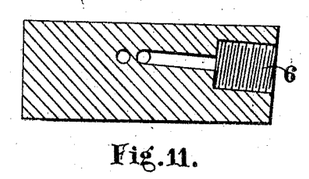
Figure 12:
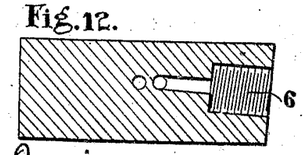
Figure 13:
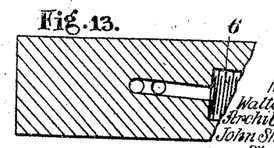

Each group of tubes *j* connects to a sub-distributer *g* diagrammatic plan and sectional elevation views of one of these sub-distributers being shown in Figs. 8 to 13. These sub-distributers are arranged to offer as nearly as possible an equal division and flow of water passing to each of the tubes *j*. The sub-distributers *k* are connected up to a distributing device *n* a detail sectional and elevation view of one form of which is shown in Figs. 5, 6 7. The distributer *n* is arranged to give an equal division and flow of feed water to each of the sub-distributers *k*. A pipe *l* provided with a non-return valve *m* connects *n* with the lower part of the drum *a*. The non-return valve *m* may in some cases be omitted. A filter *z* is preferably provided in the pipe *l* and in some cases when a filter is employed the non-return valve *m* may be dispensed with.

In some cases when few grids are used, the sub-distributers may be dispensed with and enough holes provided on the main distributer *n* to feed all the grids. Also in some cases when many grids are used sub-sub-distributers fed from the sub-distributers may be used.

The drum, *a*, is preferably situated at such a distance above the upper part of the grids, *j*, that an appreciable head is available to feed the grids, *j*.

A pipe *o*, connects the steam collector, *h*, with the upper portion of the drum, *a*, this pipe being provided with a non-return valve, *p*, which permits steam to flow from, *h*, to *a*, but not from *a* to *h*. This pipe is for the purpose of balancing the pressures in *h* and *a*. It is upon this balance of pressure that the satisfactory working of the gravity feed from *a* to the grids, *j*, and the maintenance of a supply of hot stored feed water in *a*, at a temperature not less than that corresponding to the pressure in *h* depends.

Above the grids, *j*, and between them and the drum, *a*, is situated a group of feed heating coils, *y*, preferably serpentine, these coils are heated by the gases leaving the top of the coils. A further group of feed heating coils, *x*, are provided in the upcast flue and are connected in series with the group, *y*. The feed water which may have been previously heated by exhaust steam is fed to one end of the coil, *x*, from which it descends to the group, *y*. The feed water thus meets first the relatively cool gases passing up the upcast flue and then the hotter gases leaving the tops of the grids and is progressively heated to a high temperature. After leaving the coils, *y*, the hot feed water is passed into the drum, *a*, by means of a perforated pipe, *q*, which sprays the entering water. Although a perforated pipe is described, any suitable spraying device may be employed. Any suitable form of furnace may be employed with this boiler but the form which we prefer to employ for small boilers especially is a liquid fuel furnace, and in the drawings we have shown a battery of oil fuel burners, r, by way of illustration only. A casing, t, preferably double and well lagged surrounds the drum, a, and conducts the waste gases away.

When a double casing is used the space between the two skins of the casing is in communication with the atmosphere preferably near its upper end that is in the region of the upcast, at about the level of the top of the furnace walls the space may be closed in and an air trunk leads to the furnace space. In this way the air for the furnace is heated to a considerable extent in its passage between the inner and outer skins.

In some cases a double skinned air wall may be used to surround the furnace instead of or in addition to the fire resisting material shown.

In some cases when liquid fuel furnaces are employed, a portion of the heated air is fed to the combustion space and another portion is fed to the vapor mixing space to mingle with and assist the vaporization of the liquid fuel vapor, and suitable regulating means may be provided to control the inlet of air.

The action of the generator is as follows:—Starting with the headers, c and d, and the tubes, e, full of water and the drum, a, say with water enough to cover the pipe, d, the furnace is set going. In a short time the water in the drum, a, headers, c and d, and tubes, e, will be in active circulation and rising in temperature; at the same time the grids, j, and collector, h, are being raised to a high temperature. When the temperature of the water in the drum, a, is sufficiently high, which is indicated by the pressure shown on the gage, the distributer valve, s, is opened and hot water passes through the distributer, n, to the sub-distributers, k, and on entering the grids, j, is converted into steam which is dried and more or less superheated as it passes down the grids, j.

In some cases it is preferable to open the distributer valve, s, before setting the furnace in operation in order to fill the grids and collector, h, to prevent their overheating; under these circumstances the vapor disengaged from the water in grids, j, or collector, h, will pass back to the drum, a, by the pipe, o, the engine regulating valve (not shown) being of course shut.

The drum, a, is fed with hot feed water by the pipe, q, the rate of feed being proportioned to accord with the amount of opening given to valve, s, it being necessary at all times to maintain the water level in a at least at sufficient height to cover the end of header, d, and when under full running conditions it is desirable to keep the level as high and constant as possible to meet fluctuations in load, the normal running supplies of hot feed for the grids, j, being supplied first to the drum by the system of feed heating coils, x and y, and then to the grids in order that the reserve in a, may not be reduced unless needed for meeting an overload. When however a large overload does occur, the supply of feed water is stopped by any suitable means (not shown in the drawings) and the reserve of hot water in the drum, a, is drawn upon. As this reserve is already at a temperature corresponding to the pressure at which the boiler is working, it is only necessary to supply the latent heat required to evaporate it and to superheat the steam to the required degree. The capacity of the vessel, a, must be such that it will contain a sufficient reserve of water to enable the boiler to meet any predetermined overload for a given time. Under normal running conditions the drum a, acts as an intermediary vessel in the course of the feed passing from the coils, x and y, to the grids, j, and as above stated it is desirable to maintain the level in a, as high and as constant as possible in order that the maximum reserve of hot feed water may be maintained and not reduced until required to meet an overload. This drum, a, it will be seen performs the functions of the well known Halpin thermal storage reservoir as described in the U. S. Patent specification 513,922 and gives a very great degree of flexibility to the boiler as it is possible within very wide limits to regulate the output of the boiler to the requirements of the load to be met. Further should a considerable fluctuating load have to be dealt with in service, the feed water storage drum, a, is made of sufficient capacity to cope with the peak load while the system of feed heating coils, x and y, is designed to maintain a normal supply of hot feed water. If only a small overload is to be met by the generator it is possible to maintain a small supply of feed water and the amount of steam necessary to meet this overload still be obtained because this supply of feed water will receive a preheating in the coils, x, and the temperature of the water in the thermal storage drum, a, be maintained by circulating coils, e. These grids, j, are not intended to act at any time in normal running as water heating or boiling tubes because the water fed to them by way of the storage drum, a, is already at a temperature such that the release consequent from the entrance of the water into the hot grids is sufficient in conjunction with the heat of the grids to convert the water into steam and the function of the grids, j, is to supply the necessary latent heat to evaporate and dry this steam, and to impart superheat to it, the degree of superheat being controlled by the rate of feed from the vessel and intensity of the furnace heat. Excepting by accident or misuse in no case in normal running can water find its way into the steam collector, h, as it is completely vaporized, dried and superheated in its passage downward through the grids, j. At starting however the grids, j, may under certain circumstances be used as boiling tubes as above described but this it should be distinctly understood is only a temporary condition.

Another method of starting up which we sometimes prefer to employ is to shut the valve, s, and to fill the headers, c and d, and tubes, e, and put enough water in a, to cover the end of c. We then start the furnace and when the grids, j, are hot enough pump water which is preferably, but not necessarily, passed through the preheating coils, x, into the grids by a connection on the pipe between the non-return valve, m, and the distributer, n, having first opened the valve, s, to allow the pumped water to pass to the grids, the non-return valve, m, prevents the pumped water from passing into the drum, a. The grids, j, thus act as an ordinary flash boiler but this again it should be distinctly understood is only a temporary starting condition and ceases as soon as the generator and stored water as a whole are sufficiently heated up.

We prefer to make the uniform distribution of water to all the grids, j, through the distributer, n, and sub-distributers, k, entirely dependent on the effect of gravity upon the water. In order that this effect may be completely realized it is necessary to keep the facilities offered to the flow of water to each and all the grids as uniform as possible; it is to this end that the arrangement of distributers and sub-distributers about to be described has been adapted. Further it is important that all the streams of water should fall through the same vertical height and consequently the connecting pipes and subdistributers are disposed to attain this result.

It will be understood that gravity is free to act on the water owing to the balancing of pressures in the drum, a, and collector, h, effected by the pipe, o.

A preferred construction of the sub-distributers is illustrated in Figs. 8 to 13. The pipe from n enters at 2. A ferrule, 3, provided with four holes leading from a coned recess distributes the feed entering by the pipe from n, to each of the four equally inclined passages, 4. Two of these passages are stopped by plugs, 5. The passages each communicate with passages, 6, which lead to the grids forming the group of grids which are fed by the sub-distributer. The passages, 6, are also inclined the inclinations of all the passages, 6, being identical. It will be seen that by thus keeping all the inclinations and facilities for flow equal for all the passages offered to the feed, an equal distribution of the feed is obtained. All the sub-distributers are alike and offer equal facilities for flow. An equal distribution to all the grids is thus obtained.

In conjunction with this generator we may use various well known automatic devices for controlling the feed of water to the drum, a, by way of the coils, x and y, also the feed of water from the drum, a, to the grids, j, also the intensity of the furnace temperature. These automatic controlling devices may be dependent for this actuation either upon outside means, or upon the pressure or temperature of the steam or the furnace gases or a combination of these and may be in some cases interconnected. These automatic controlling devices however form no part of the present invention.

Although we have described and illustrated one method of carrying our invention into effect we in no way limit ourselves to this particular construction. For instance we may in some cases arrange the grids, j, radially around a circle or at right angles to one another, again the feed storage drum, a, may take the form of a vertical vessel and may be differently constructed and may in some cases be provided with tubes inside or outside or Field tubes or the like, and may be placed in any convenient position with respect to the remainder of the parts of the generator. When the drum, a, is placed in such a position that there is no head of water available to feed the grids by gravity from the drum, a, the supply of hot feed from a, to the grids may be effected by means of a pump, injector or the like, the pump or injector taking water from a and delivering it to the distributer, n. Further the form of furnace wall and disposition of water wall (when a water wall is used) sub-distributers and steam collector may be varied as required. The cross section of the tubes employed in the grids, j, and tubes, e, has been shown as circular but may be of any suitable section for instance triangular or square.

The non-return valves shown in the pipes, l and o, may in some cases be omitted and the form of the distributer, n, and sub-distributers, k, may be varied to suit the requirements of modified designs.

It is to be observed that the breaking up of the stored feed water circulating in the water wall tubes, e, and the division of the feed water passing from the drum, a, to the grids, j, into a number of separate streams each of which has the same area of cross-section as the original tubes, has the effect of reducing the internal frictional resistances of the boiler.

Having now described our invention what we claim as new and desire to secure by Letters Patent is:—

1. In combination with a steam generator, a thermal storage vessel containing water and adapted to store the heat received from the generator when the latter is generating an excess of steam, means externally connected to said vessel to maintain the water in the thermal storage vessel at a temperature substantially equal to that corresponding to the pressure of the steam generating in the generator and a flash element to which said water is delivered whereby said flash element has only to supply the heat necessary to evaporate said water without changing the temperature thereof.

2. In combination with a steam generator, a thermal storage vessel containing water and adapted to store the heat received from the generator when the latter is generating an excess of steam, means acting independently of the generator to maintain this water at the temperature of the steam in contact with it, a flash element and means for obtaining an uninterrupted flow of hot water to said flash element from the thermal storage vessel whereby the former supplies only the heat necessary to evaporate said water without changing the temperature thereof.

3. A steam generator comprising in combination a thermal storage vessel containing water and adapted to store the heat received from the generator when the latter is generating an excess of steam, a flash element in uninterrupted communication with said vessel and means for maintaining said water at the temperature substantially corresponding to the pressure at which steam is generated, said means comprising a plurality of water circulating and heating elements forming part of said thermal storage vessel, said flash element comprising a plurality of tubes for generating and superheating the steam whereby the flash element supplies only the heat necessary to vaporize said water when steam is required.

4. In combination with a steam generator, a thermal storage element containing water and adapted to store the heat received from the generator when the latter is generating an excess of steam, said thermal storage element consisting of a feed water storage drum and a plurality of water circulating and heating elements in connection therewith, said flash element consisting of a plurality of tubular flash steam generating and superheating elements receiving water at a temperature corresponding to the pressure of the steam delivered by the generator in parallel or in series from the bottom of the feed water storage drum.

5. A steam generator comprising in combination a flash element and a thermal storage element in uninterrupted communication therewith, said thermal storage element consisting of a feed water storage drum and a plurality of feed water circulating and heating elements and said flash element consisting of a plurality of tubular flash generating and superheating elements arranged in a vertical zigzag manner, a steam collector into which the lower ends of said tubular elements connect, a connection between the upper ends of said tubular elements and the bottom of said feed water storage drum and means in said connection acting to uniformly distribute the water to said tubular flash steam generating and superheating elements.

6. A steam generator comprising in combination a flash element, a thermal storage element in uninterrupted communication therewith and a furnace therefor, said thermal storage element consisting of a feed water storage drum, headers in communication with said drum and a plurality of tubes connecting said headers, the circulation through said tubes, headers and drum taking place by convection, said tubes being arranged to form a water wall around said furnace and said flash element consisting of a plurality of tubular flash steam generating and superheating elements arranged in a vertical zigzag manner, a steam collector into which the lower ends of said tubular elements connect, a connection between the upper ends of said tubular elements and the bottom of said feed water storage drum, and means in said connection acting to uniformly distribute the feed water to said tubular flash steam generating and superheating elements.

7. A steam generator comprising in combination a flash element, a thermal storage element in uninterrupted communication therewith and a furnace therefor, said thermal storage element consisting of a feed water storage drum headers in communication with said drum and a plurality of tubes connecting said headers, the circulation through said tubes, headers and drum taking place by convection, said tubes being arranged to form a water wall around said furnace and said flash element consisting of a plurality of tubular flash steam generating and superheating elements arranged in a vertical zig-zag manner, a steam collector into which the lower ends of said tubular elements connect, a connection between the upper ends of said tubular elements and the bottom of said feed water storage drum, means in said connection acting to uniformly distribute the feed water to said tubular flash steam generating and superheating elements and a communication between said steam collector and said feed water storage drum whereby the steam pressure in these elements is equalized and the feed from said drum to the flash steam generating and superheating elements can take place by gravity.

In testimony whereof we have signed our names to this specification in the presence of two subscribing witnesses.

ARCHIBALD EDWARD DOBBS.
WALTER EAST.
JOHN SHIRLEY HOWKINS.

Witnesses to the signatures of the said Walter East and John Shirley Howkins:
THOMAS H. WEST,
BERTRAM H. MATTHEWS.

Witnesses to the signature of the said Archibald Edward Dobbs:
PAUL KNABENSHUE,
M. E. ORR.